(12) United States Patent
Stewart

(10) Patent No.: US 11,481,818 B2
(45) Date of Patent: Oct. 25, 2022

(54) AUTOMATED VALUATION MODEL USING A SIAMESE NETWORK

(71) Applicant: Opendoor Labs Inc., San Francisco, CA (US)

(72) Inventor: Michael Andrew Stewart, San Francisco, CA (US)

(73) Assignee: Opendoor Labs Inc., San Francisco, CA (US)

( * ) Notice: Subject to any disclaimer, the term of this patent is extended or adjusted under 35 U.S.C. 154(b) by 236 days.

(21) Appl. No.: 17/019,712

(22) Filed: Sep. 14, 2020

(65) Prior Publication Data

US 2022/0084079 A1    Mar. 17, 2022

(51) Int. Cl.
| | |
|---|---|
| *G06Q 30/02* | (2012.01) |
| *G06Q 50/16* | (2012.01) |
| *G06N 5/04* | (2006.01) |
| *G06N 20/00* | (2019.01) |

(52) U.S. Cl.
CPC .......... *G06Q 30/0278* (2013.01); *G06N 5/04* (2013.01); *G06N 20/00* (2019.01); *G06Q 30/0206* (2013.01); *G06Q 50/16* (2013.01)

(58) Field of Classification Search
CPC .......... G06Q 30/0206; G06Q 30/0278; G06Q 50/16; G06N 20/00
See application file for complete search history.

(56) References Cited

U.S. PATENT DOCUMENTS

| | | | |
|---|---|---|---|
| 10,055,788 B1* | 8/2018 | Tatang | G06Q 40/06 |
| 2014/0164260 A1* | 6/2014 | Spieckerman | G06Q 50/16 |
| | | | 705/306 |
| 2019/0043144 A1* | 2/2019 | Hildebrand | G06Q 50/16 |

(Continued)

OTHER PUBLICATIONS

Viriato, J. C. (2019). AI and machine learning in real estate investment. Journal of Portfolio Management, 45(7), 43-54. (Year: 2019).*

(Continued)

*Primary Examiner* — William S Brockington, III
(74) *Attorney, Agent, or Firm* — Schwegman Lundberg & Woessner, P.A.

(57) ABSTRACT

Systems and methods are disclosed for automatically determining property value, the systems and methods perform operations comprising: receiving, by a server, subject real-estate property listing information associated with a subject real-estate property; identifying a plurality of comparable real-estate property listings based on attributes of the subject real-estate property listing information; processing the subject real-estate property listing information together with the plurality of comparable real-estate property listings using a trained machine learning technique to predict a value for the subject real-estate property, the trained machine learning technique being trained to jointly establish a relationship between weights assigned to a set of training comparable real-estate property listings and value adjustments of the set of training comparable real-estate property listings and a value of a real-estate property of interest; and performing an action with respect to the subject real-estate property based on the predicted value of the subject real-estate property.

20 Claims, 7 Drawing Sheets

(56) References Cited

U.S. PATENT DOCUMENTS

2019/0251604 A1* 8/2019 Agassi ............... G06Q 30/0278
2021/0279824 A1* 9/2021 Choi .................. G06Q 30/0206

OTHER PUBLICATIONS

Guo, J., Shu-hen Chiang, Liu, M., Chi-Chun, Y., & Kai-yi, G. (2020). Can machine learning algorithms associated with text mining from internet data improve housing price prediction performance? International Journal of Strategic Property Management, 24(5), 300-312. (Year: 2020).*

Kintzel, J. D. (2019). Price prediction and deep learning in real estate valuation models (Order No. 28275544). Available from ProQuest Dissertations and Theses Professional. (2511164700). (Year: 2019).*

* cited by examiner

AUTOMATED VALUATION MODEL USING A SIAMESE NETWORK

BACKGROUND

The value of a given real-estate property depends on a variety of factors. The decisions a seller of the real-estate property makes concerning sale of the real-estate property heavily depend on the value of the real-estate property. Sellers typically spend a great deal of resources analyzing sales of similar properties in the seller's market to estimate the value of the seller's property. Such tasks, however, are typically very time consuming and ultimately end up being inaccurate which result in sellers making poor decisions concerning the real-estate property sale.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
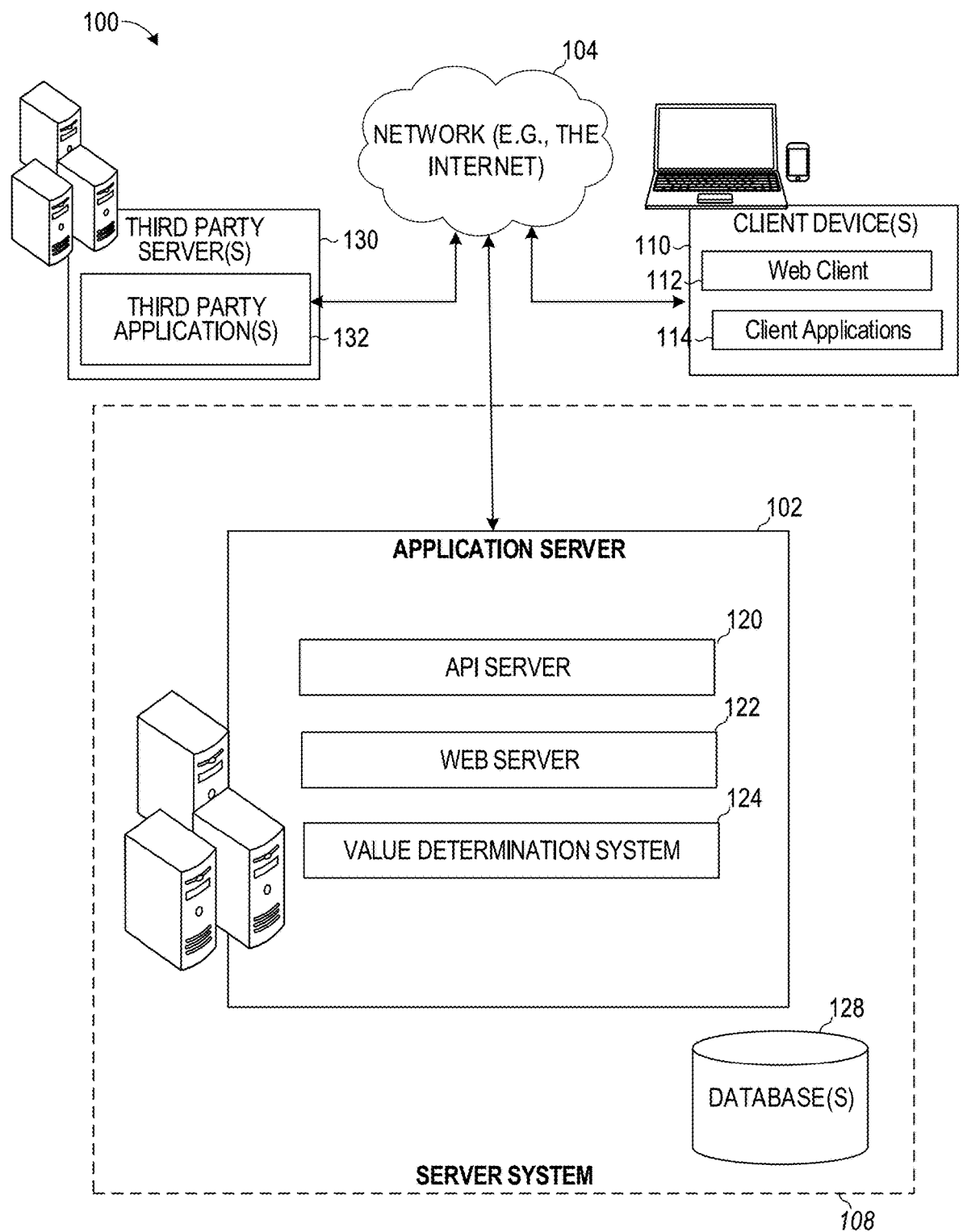
FIG. 1 is a block diagram illustrating a networked system for predicting a value for a real-estate property, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Accurately determining a value for a given real-estate property is key to performing real-estate property transactions. For example, setting a value for the property that is too high may increase how long the property will take to sell and setting a value that is too low may cause the seller to lose profit. Inaccurately determining the value for a given property can result in lost profits for a seller, delay in negotiations and selling of a property, and can even impact selling decisions other property owners make.

As referred to herein, listing a real-estate property means publicly announcing the availability of a given real-estate property for purchase (announcing that a property is being put on sale). The public announcement may take various forms including posting pictures and/or details on one or more websites, newspapers, listing databases, communicating the offer for sale to one or more real-estate brokers or any other means to inform an interested party that the property is available for sale. The value for a property listed for sale is referred to as the asking price. The value of a property after closing the sale is referred to as the closing price.

The systems available for determining a value for a given real-estate property require a seller to manually analyze various country- or jurisdiction-based statistics. Certain systems automatically compute a value for a given real-estate property by analyzing sale information for comparable properties. Such systems typically separately automatically identify similar properties and compute a weight for each identified property. These systems also separately adjust close prices for the identified properties. These typical systems then combine the adjusted close prices with the computed weights to derive a sale or asking price for the given real-estate property. While such systems generally work well, having many separate models (e.g., one for identifying similar properties, another for computing weights, and another for determining price adjustments) increases the overall complexity of the systems and reduce the overall accuracy.

The disclosed embodiments improve the efficiency and accuracy of predicting a value (e.g., closing or close price) for a given real-estate property by training a machine learning technique (or machine learning model, such as a Siamese Network) to jointly establish a relationship between weights assigned to a set of training comparable real-estate property listings and value adjustments of the set of training comparable real-estate property listings and a value of a real-estate property of interest. Namely, jointly establishing the relationship entails the model parameters of the machine learning technique governing weights and adjustments being both updated by the exact same training process at the exact same time using the exact same data samples. The trained machine learning technique is then applied to new or subject real-estate property associated with a new real-estate property allowing the disclosed embodiments to accurately predict a value or closing price for the subject real-estate property. This significantly reduces the amount of research and time a user needs to spend estimating the value for the property and increases the overall accuracy of predicting property values.

FIG. 1 is a block diagram illustrating a networked system 100, according to some example embodiments, configured to predict a value (closing or sale price) for a real-estate property. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth.

The client device 110 may be a device of a user or operator that is used to access and utilize home buying services (e.g., request a sale price or value to be predicted or estimated for a given real-estate property). For example, the client device 110 may be used to input information to request an automated offer on a subject real-estate property, to request a value of a subject real-estate property, to request one or more real-estate property transaction documents to be automatically selected and populated, to make an offer on a subject real-estate property, to receive and display various information about a subject real-estate property or a market, to view a distribution of values for a subject real-estate property, to view changes to weights and/or comparable adjustments as a function of a distribution of values for a subject real-estate property, and so forth.

In one example, the client device 110 is a device of a given user who would like to sell his or her subject real-estate property. Client device 110 accesses a website of the home buying and selling service (e.g., hosted by server system 108). The user inputs an address of the subject real-estate property and selects an option to receive an automated offer or value of the subject real-estate property in the website. Server system 108 receives the request and identifies comparables or "comps" (e.g., a plurality of comparable real-estate properties) having similar attributes as the subject real-estate property. Server system 108 automatically retrieves characteristics of the subject real-estate property based on the address and searches for comps within a predetermined distance (e.g., 1.2 miles) of the address of the subject real-estate property. In some implementations, the server system 108 applies one or more trained machine learning techniques to identify the comps for the subject real-estate property. The trained machine learning techniques are trained to establish a relationship between attributes of a given real-estate property and attributes of a plurality of comparable real-estate properties. For example, the trained machine learning techniques may be neural networks that identify a set of 10 or more comparable real-estate properties that have recently sold, such as in the past 6 months or 1 year, that are of a similar size, are within a predefined geographical distance, and of the same type as the given or subject real-estate property.

Server system 108 then automatically computes or predicts a value for the subject real-estate property and provides the value to the client device 110 instantly or after a period of time (e.g., 24 hours). For example, the server system 108 retrieves another trained machine learning model (e.g., a Siamese Network) that receives listing information for a plurality of comps and listing information for a subject real-estate property. The trained machine learning model outputs a value for the subject real-estate property and a set of weights for the comps based on the listing information of the comps and the subject real-estate property. The trained machine learning model is trained to jointly establish a relationship between weights assigned to the set of comps and value adjustments of the set of comps and a value of a real-estate property of interest. In some cases, the trained machine learning technique is further trained to jointly optimize mean and uncertainty predictions for the set of training comparable real-estate properties. The weights assigned to the set of training comparable real-estate properties represent how much a value of a respective one of the set of training comparable real-estate properties influences the value of the real-estate property of interest. The value adjustments represent how much more or less expensive the respective one of the set of training comparable real-estate properties is relative to the real-estate property of interest.

In some implementations, the trained machine learning technique is configured to output first and second quantities. The first quantity represents an estimate of a relative price difference between the subject real-estate property and a given comparable real-estate property listing of the plurality of comparable real-estate property listings. The second quantity represents a weight characterizing a relative strength of each comparable real-estate property listing. The trained machine learning model is configured to predict or estimate the value of the subject real-estate property by: adjusting values of the plurality of comparable real-estate property listings based on the first quantity associated with each of the plurality of comparable real-estate property listings; and modifying the adjusted values respectively by the second quantity of each of the plurality of comparable real-estate property listings to compute a point estimate of the value of the subject real-estate property.

The process for training a machine learning technique to estimate or predict a value for a real-estate property of interest and the process for applying the machine learning technique that has been trained to a new real-estate property are discussed below in connection with FIGS. 2 and 3.

In some circumstances, server system 108 involves an operator of a website of the home buying and selling service using an operator device to review the value that was automatically computed before the value is returned to the client device 110. Client device 110 receives the value and provides an option to the user to complete the real-estate property transaction. For example, the user selects an option to complete the sale of the real-estate property. In response, server system 108 automatically generates one or more real-estate property transaction documents (e.g., a contract for sale of the subject real-estate property) and allows the user to execute the documents to complete the sale. After the user executes the documents the subject real-estate property enters a pending status. Server system 108 may present a list of available closing dates to the user. Once the user selects the closing date, the subject real-estate property closes at the contract price on the closing date.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a real estate application, and the like.

In some embodiments, one or more client applications 114 are included in a given one of the client device 110, and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access market information related to homes, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or wide area network (WAN)) to one or more third-party servers 130 and/or one or more client devices 110. The server system 108 includes an application program interface (API) server 120, a web server 122, a value determination system 124, that may be communicatively coupled with one or more databases 128. The one or more databases 128 may be storage devices that store data related to users of the system 108, applications associated with the system 108, cloud services, housing market data, one or more machine learning techniques and so forth. The one or more databases 128 may further store information related to third-party servers 130, third-party applications 132, client devices 110, client applications 114, users, and so forth. In one example, the one or more databases 128 may be cloud-based storage.

In one example, the one or more databases 128 may be cloud-based storage. The one or more databases 128 may store real-estate property listing information for closed or previously sold real-estate properties. The server system 108 may be a cloud computing environment, according to some example embodiments. The server system 108, and any servers associated with the server system 108, may be associated with a cloud-based application, in one example embodiment.

The server system 108 includes a value determination system 124. Value determination system 124 includes one or more modules, storage devices and databases. The storage devices in value determination system 124 store various real-estate property listings for previously sold properties and properties currently available for sale. The storage devices also store one or more machine learning techniques for identifying comps for a subject real-estate property. The storage devices also store one or more machine learning techniques for predicting a value for the subject real-estate property based on the identified comps by jointly analyzing weights and price or value adjustments of the comps. The modules in value determination system 124 are configured to train a machine learning technique to predict or estimate the value for a given or subject real-estate property by jointly establishing a relationship between weights assigned to comps and value adjustments of the comps and a value of a real-estate property of interest.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include a multiple listing service (MLS) server. This service is publicly accessible to real-estate brokers nationwide. A real-estate broker inputs property information to the MLS server (e.g., price information, property attributes, listing date of a property, date contract to sell the property was executed, closing date of the property, etc.) to list the property for sale and to complete transactions for the property. Other brokers can access the MLS server to search and filter properties available for sale or that have been sold and select a given property to view. The MLS server may allow a real-estate broker to provide an offer to purchase a given property being listed for sale on behalf of a buyer. The MLS server may indicate whether and when a given property listing is pending indicating that an executed purchase and sale agreement between a buyer and seller of the real-estate property has been received. The MLS server may indicate whether and when a sale for a given property has been closed indicating that the legal transfer of title to the property from the seller to the buyer has been recorded in a government database.

The MLS server may include a database of real-estate properties. Characteristics of each property stored in the MLS server may also be provided. Characteristics include a location of the property, a school district, a tax rate, a home owners association rate, interior conditions (e.g., whether the property has been renovated, whether the property has stainless steel appliances, whether the property has a pool, whether the property has granite countertops), whether the property is characterized as new construction, whether the property has previously been occupied, and so forth. The information of the MLS server may be included as part of database 128. Any of the MLS real-estate properties information (listing information) may be used by a trained machine learning model to search for and identify comps for a subject real-estate property. After the comps are identified another different machine learning model is applied to the comps and a subject real-estate property to estimate the value for the subject real-estate property. The MLS real-estate properties information may include real-estate property activities and may be used to train a machine learning technique to jointly establish a relationship between the value adjustments of the comps and the respective weights associated with each of the comps and a value of a subject property.

Figure 2:
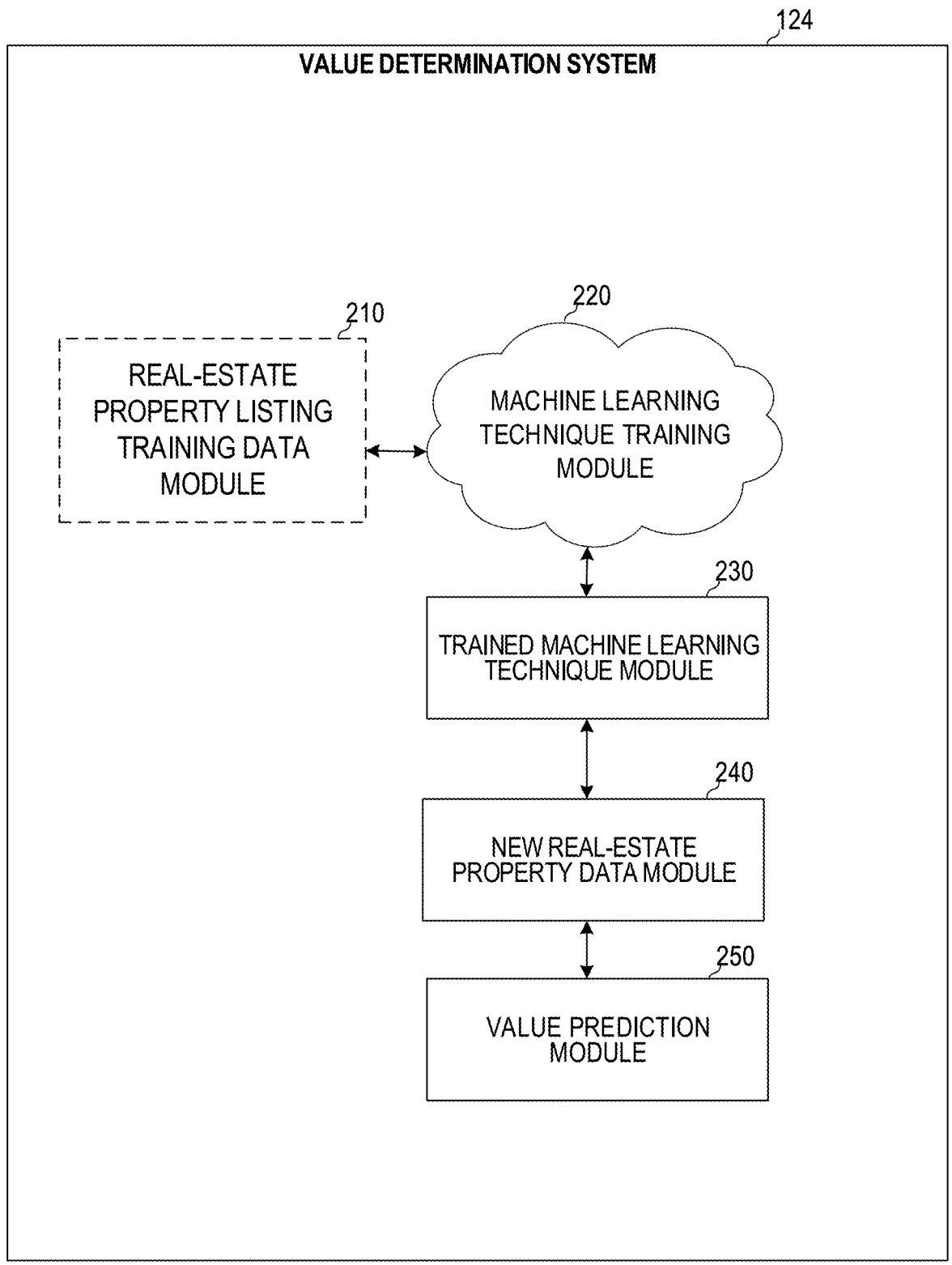
FIG. 2 illustrates a real-estate property listing value determination system, according to some example embodiments.

FIG. 2 illustrates a value determination system 124, according to some example embodiments. Value determination system 124 includes a real-estate property listing training data module 210, a machine learning technique training module 220, a trained machine learning technique module 230, a new real-estate property data module 240, and a value prediction module 250. In some implementations, some modules of value determination system 124 may be implemented on server system 108 and others may be implemented on third party servers 130. In some implementations, all of the modules of value determination system 124 are implemented on server system 108 or on third party servers 130. In such cases, server system 108 communicates information to third party servers 130 based on the modules implemented and vice versa.

Real-estate property listing training data module 210 includes a list of real-estate property properties that have previously been sold along with their various attributes and listing information. The real-estate property listing information is obtained by real-estate property listing training data module 210 from database 128 and/or from third party server 130.

Machine learning technique training module 220 may be a Siamese Network that is trained to predict or estimate a value for a given or subject real-estate property by jointly establishing a relationship between weights assigned to a set of comps and value adjustments of the set of comps and a value of a real-estate property of interest.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for predicting a value for a given property.

The machine-learning algorithms utilize features (e.g., weights and value adjustments for comps) for analyzing the data to generate assessments (e.g., a value for a subject real-estate property). A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes, such as the values of the comps.

Once the training data are collected and processed, machine learning technique training module 220 model can be built using either statistical learning or machine learning techniques. In one embodiment, regression analysis can be used to build the machine learning technique training module 220 model. Regression analysis is a statistical process for estimating the relationships among variables. There are a number of known methods to perform regression analysis, for example: linear regression or ordinary least squares regression, among others, are "parametric" in that the regression function is defined in terms of a finite number of unknown model parameters that can be estimated from training data. For a value prediction, a regression model (e.g., Equation 1) can be defined, for example, as:

$$H \approx f(X, \beta),\qquad\text{(Equation 1)}$$

where "H" denotes the known values for a set of properties, "X" denotes a vector of input variables (e.g., any one of the real-estate property listing information associated with a set of comps), and "β" denotes a vector of unknown parameters to be determined or trained for the regression model. In some embodiments, there are two vectors of unknown parameters, such as in the case of jointly training the machine learning technique or model. During training, two modules of the machine learning technique training module 220 are trained jointly to estimate the value for the set of properties based on one or two vectors of unknown parameters. The modules are trained based on the same vector of unknown parameters or based on two vectors of unknown parameters. A first of the modules is trained to estimate weights for the comps and a second of the modules is trained to estimate price adjustments for the comps. Their corresponding outputs of the two modules are combined to generate a point estimate of a value for a real-estate property of interest. This value is compared with the known sale prices or values H to update the one or two vectors of unknown parameters of the machine learning technique training module 220 to estimate a value for a new real-estate property. In cases where the modules are trained jointly, the same data vector X of input variables is used to estimate one or two vectors of unknown parameters.

Once β is estimated, the model can then compute H (e.g., value or price) for a new set of X values (e.g., feature vectors extracted from a new real-estate property and new set of comps).

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In an example, a delineation between data clusterings is used to select a model that produces the clearest bounds for its clusters of data.

In some embodiments, the value determination system 124 may re-train the machine learning technique training module 220 (e.g., adjust the coefficients of the function) on a periodic basis (e.g., weekly, monthly, daily, for each season) to account for new real-estate properties that have recently closed. In some other embodiments, the value determination system 124 may train the machine learning technique training module 220 (e.g., adjust the coefficients of the function) in real time as new property activities are detected (e.g., each time a value for a given property is updated in database 128). For example, in response to detecting that a real-estate property listing in the MLS server has changed to pending status, the machine learning technique training module 220 may obtain one or more real-estate property listing information associated with that property and retrain itself to recompute the coefficients based on the information about the property that has changed to pending status.

After being trained, the machine learning technique is provided to trained machine learning technique module 230. In one example, the coefficient values of the linear model are stored in a storage of trained machine learning technique module 230. Trained machine learning technique module 230 is configured to receive new real-estate property listing information from new real-estate property data module 240. For example, new real-estate property data module 240 receives a user input that identifies a particular property or listing identifier associated with a property. New real-estate property data module 240 accesses database 128 and/or server 130 to obtain comps for the new real-estate property, such as by applying a trained machine learning model to identifies a set of comps for a subject real-estate property. For example, new real-estate property data module 240 obtains the property address, one or more attributes of the property, date of when the property was listed and/or any other activity associated with the property. New real-estate property data module 240 instructs the trained machine learning technique module 230 to apply the trained machine learning technique using the previously computed coefficients to the data provided by new real-estate property data module 240 and the identified set of comps. Trained machine learning technique module 230 provides a predicted value to the value prediction module 250 for the subject real-estate property based on the data provided by new real-estate property data module 240.

The value prediction module 250 stores, outputs (e.g., by way of a preview or user interface on an app or a website), sends an SMS, sends an MMS, causes a computing device to display, or emails the predicted value for the property identified by new real-estate property data module 240 to a user or operator at the client device 110.

Figure 5:
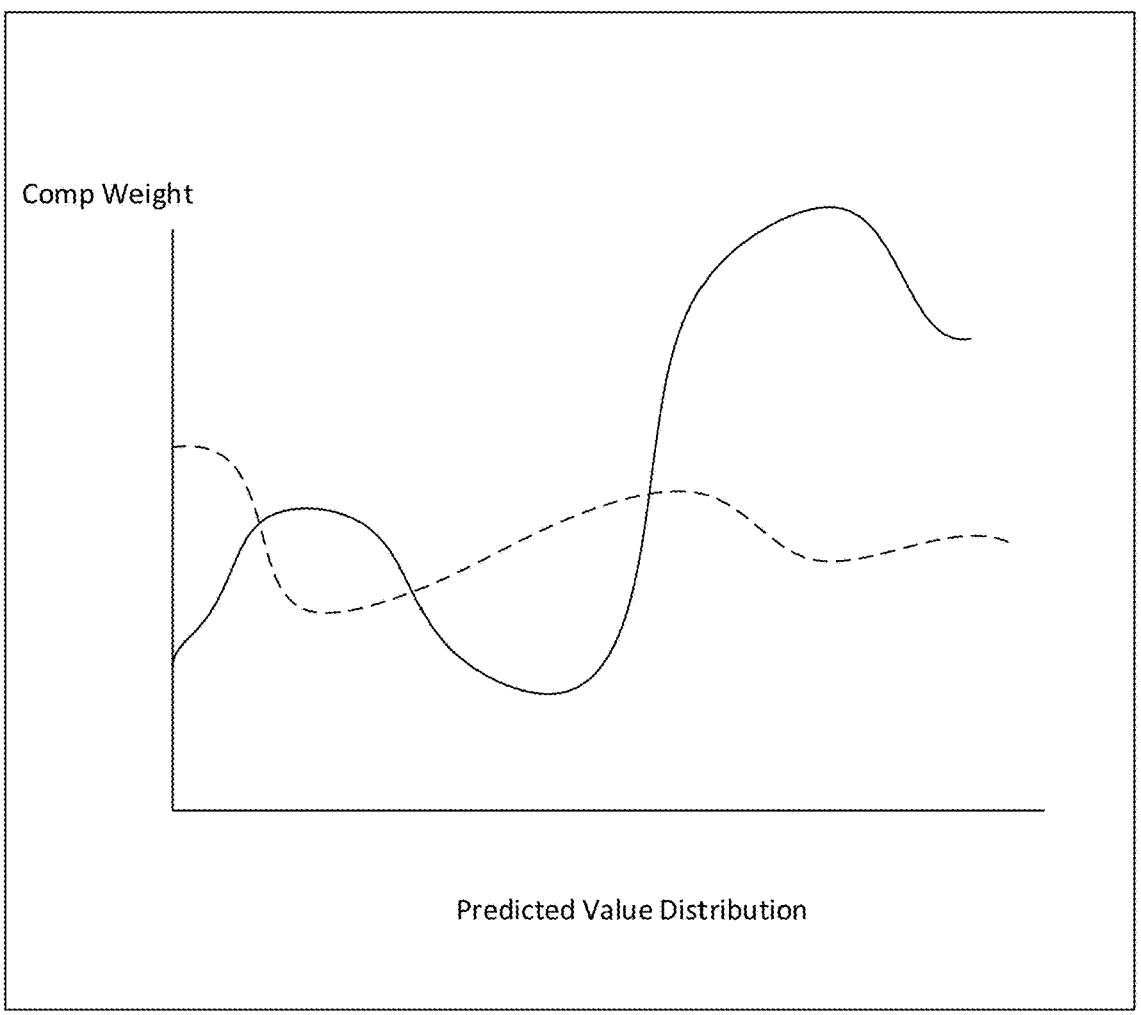
FIG. 5 illustrates a distribution of value for a real-estate property and the effect on the weights of the comparable properties, according to some example embodiments.

In some embodiments, the value prediction module 250 outputs a distribution of values for a subject real-estate property. For example, the value prediction module 250 receives from the trained machine learning technique module 230 a predicted value that is above a median, such as in the $75^{th}$ percentile, and another value that is below the median, such as in the $25^{th}$ percentile. The trained machine learning technique module 230 may also provide the corresponding value adjustments and/or weights associated with the comps to generate the various distribution of values. The value prediction module 250 presents to a user the distribution of values along with how the weights of the comps vary as the values change over the distribution. The value prediction module 250 can also or alternatively present to a user the distribution of values along with how the adjustments to values of the comps vary as the values change over the distribution. In this way, if an operator indicates or requests a value that is in the $75^{th}$ percentile, the operator can see the weights for the comps associated with that value and can see how the weights change for the comps relative to the median value of the subject property. An illustrative distribution 500 of values is shown in FIG. 5. In one example, an illustrative distribution of the values for a given subject property can be presented to a user. For example, a plot of discrete values each corresponding to a different point along a distribution of values of the subject property that are predicted can be presented to the user.

For example, the distribution 500 presents to a user a distribution of values from the $10^{th}$ percentile to the $99^{th}$ percentile computed or estimated for a subject real-estate property. This may be presented along the horizontal x-axis. The corresponding comp weights and/or value adjustments of each comp may be represented along the vertical axis. Each comp may be represented using a different color or style of a line to allow the operator to see how the weights and/or value adjustments for the different comps change relative to each other and relative to a given value along the distribution. For example, a selected value for a given property that is estimated to be in the $10^{th}$ percentile along the distribution may result from a 0.4 comp weight assigned to a first comp (shown with a solid line) and a 0.6 comp weight assigned to a second comp (shown with a dashed line). The same given property may have a median value selected that is estimated and results from a 0.6 comp weight assigned to a first comp (shown with a solid line) and a 0.4 comp weight assigned to a second comp (shown with a dashed line). This allows the operator to visually see how the comp weights vary with changes to the distribution of values estimated for a given property. This also may allow the operator to visually see how the comp value adjustments vary with changes to the distribution of values estimated for a given property.

Figure 3:
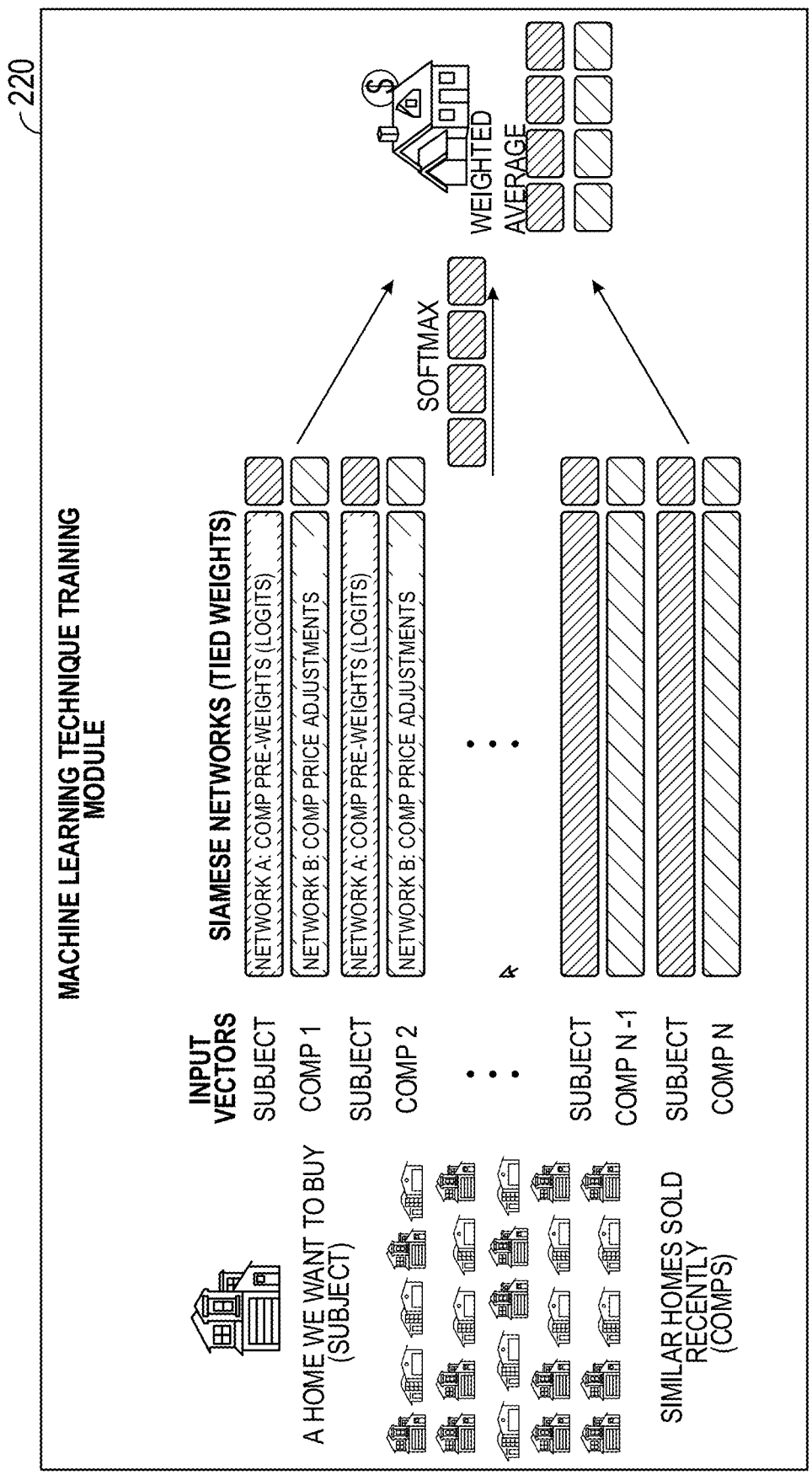
FIG. 3 illustrates a machine learning technique training module, according to some example embodiments.

FIG. 3 illustrates a machine learning technique training module 220, according to some example embodiments. The machine learning technique training module 220 may be implemented as a Siamese Network, transformer-style network, triplet loss network, and/or an embedding lookup scheme. A Siamese neural network (sometimes called a twin neural network) is an artificial neural network that uses the same weights while working in tandem on two different input vectors to compute comparable output vectors. Often one of the output vectors is precomputed, thus forming a baseline against which the other output vector is compared.

As shown in FIG. 3, the machine learning technique training module 220 receives input vectors that include a subject real-estate property listing and a plurality of comps (e.g., comp 1-N). In some implementations, the input vectors are tensors of three dimensions. A first dimension of the tensors represents various subject properties, a second dimension of the tensors represent the comparable properties for each subject that is in the first dimension, and a third dimension represents the features of each comparable property and subject property. To train the machine learning technique training module 220, a plurality of previously closed listings for real-estate properties is retrieved, such as from the input tensors. The plurality of previously closed listings may correspond to a particular geographical region (e.g., a neighborhood, a zip code, a city, a state, a country, and any combination thereof). Once the plurality of previously closed listings is retrieved, a first previously closed listing is selected as the subject real-estate property listing. For example, a two-dimensional vector for the first previously closed listing is retrieved that includes a plurality of features of the first previously closed listing. Another machine learning technique is applied to the first previously closed listing to identify a subset of comps from the plurality of previously closed listings that share attributes with the first previously closed listing. This results in an input vector that includes the first previously closed listing and a subset of comps for the first previously closed listing. The closing sale prices of the first previously closed listing and a subset of comps for the first previously closed listing are retrieved as the ground truth values for training the machine learning technique training module 220.

The input vector or in some cases the three-dimensional tensor is applied to the Siamese Networks which estimates in tandem or jointly, a weight of each comp in the subset and a price adjustment for each comp in the subset. Specifically, the Siamese Network takes data from the subject real-estate property and a given one of the comps for the subject real-estate property. The data received by the Siamese Network may include listing features, such as photos, satellite imagery, text, sale price, visits by potential buyers, length of time on the market as well as contextual information about the given one of the comps. The Siamese Network then outputs two quantities: an estimate of the relative price difference between the given comp and the subject property and a logit or un-normalized weight characterizing the relative strength of the given comp. The weight assigned to one comp is estimated relative to the weights assigned to each of the other comps. Namely, the weights assigned to all of the comps may add up to '1'. The weights are applied to a Softmax operator along with the estimated price adjustments to derive or estimate a point value for the first previously closed listing. For example, the network computes or estimate a price adjustment for a given one of the comps to reflect how much more or less the value or sale price of the comp should be reduced to match the estimated value of the first previously closed listing. Based on the estimated weight for the given one of the comps, the price, adjusted based on the price adjustment, is increased or decreased and combined linearly with adjusted prices of the remaining comps. For example, if there are three comps, a first weight of value 0.3 may be assigned to a first comp, a second weight of value 0.2 may be assigned to a second comp, and a third weight of value 0.5 may be assigned for a third comp. Together the weights add up to '1'. The price of the first comp, as adjusted based on the adjustment value that is estimated for the first comp, may be multiplied by the first weight; the price of the second comp, as adjusted based on the adjustment value that is estimated for the second comp, may be multiplied by the second weight; and price of the third comp, as adjusted based on the adjustment value that is estimated for the third comp, may be multiplied by the third weight. The weighted adjusted prices are added together to estimate the value for the subject real-estate property.

The ground truth value for the first previously closed listing is retrieved and compared with the estimated value of the first previously closed listing. A regression loss is then computed based on a point estimate of the value for the first previously closed listing and the ground truth value. Parameters of the machine learning technique training module 220 are updated based on the regression loss. Then, the machine learning technique training module 220 is similarly applied to a second previously closed listing to again update the parameters.

For example, after updating the parameters, the previously closed listing selects the second previously closed listing from the plurality of previously closed listings. The other machine learning technique is applied to the second previously closed listing to identify a subset of comps from the plurality of previously closed listings that share attributes with the second previously closed listing. This results in another input vector that includes the second previously closed listing and a subset of comps for the second previously closed listing. The closing sale prices of the second previously closed listing and a subset of comps for the second previously closed listing are retrieved as the ground truth values for training the machine learning technique training module 220.

In some implementations, the parameters of the machine learning technique training module 220 are updated after a batch of subject is processed rather than based on an individual closed listing. For example, a cluster of subjects of closed listings may be retrieved from a three-dimensional tensor and applied to the machine learning technique training module 220. All of the subjects of closed listings in the cluster are considered simultaneously to update the parameters of the machine learning technique training module 220 based on a regression loss. After updating the parameters, another cluster of subjects of closed listings is retrieved and used to again update the parameters.

The input vector or tensor is applied to the Siamese Networks which estimates in tandem or jointly, a weight of each comp in the subset and a price adjustment for each comp in the subset. The weights are applied to a Softmax operator along with the estimated price adjustments to derive or estimate a point value for the second previously closed listing. The ground truth value for the second previously closed listing is retrieved and compared with the estimated value of the second previously closed listing. A regression loss is then computed based on a point estimate of the value for the second previously closed listing and the ground truth value. Parameters of the machine learning technique training module 220 are again updated based on the regression loss. This process continues to update the parameters of the machine learning technique training module 220 until all or a predetermined quantity of the plurality of previously closed listings is processed in a similar manner as the first and second previously closed listings.

In some cases, multiple regression losses may be utilized. Each regression loss may correspond to a different distribution of values. For example, one regression loss may represent a below median value of the $10^{th}$ percentile or $25^{th}$ percentile, another regression loss may represent the median value, and a third regression loss may represent an above median value of $90^{th}$ percentile or $75^{th}$ percentile. In this way, the machine learning technique training module 220 can be trained to output a distribution of values along with the corresponding weights along the distribution of values for a given subject real-estate property listing. For example, machine learning technique training module 220 may receive input that requests a value that is above the median of the $90^{th}$ percentile or $75^{th}$ percentile. In such cases, the machine learning technique training module 220 is trained based on the above median regression loss and outputs the value estimated for a subject real-estate property that is above the median of the $90^{th}$ percentile or $75^{th}$ percentile along with the weights of the comps that are estimated when estimating the value that is above the median of the $90^{th}$ percentile or 75th percentile. In another example, machine learning technique training module 220 may receive input that requests a value that is below the median of the $10^{th}$ percentile or $25^{th}$ percentile. In response, the machine learning technique training module 220 is trained based on the below median regression loss and outputs the value estimated for a subject real-estate property that is below the median of the $10^{th}$ percentile or $25^{th}$ percentile along with the weights of the same comps that are estimated when estimating the value that is below the median. Because the weights and adjustments are estimated jointly, the machine learning technique training module 220 is able to provide information on how the weights vary as the distribution of values for a given subject real-estate property vary from a quantile below the median value to a quantile above the median value.

Figure 4:
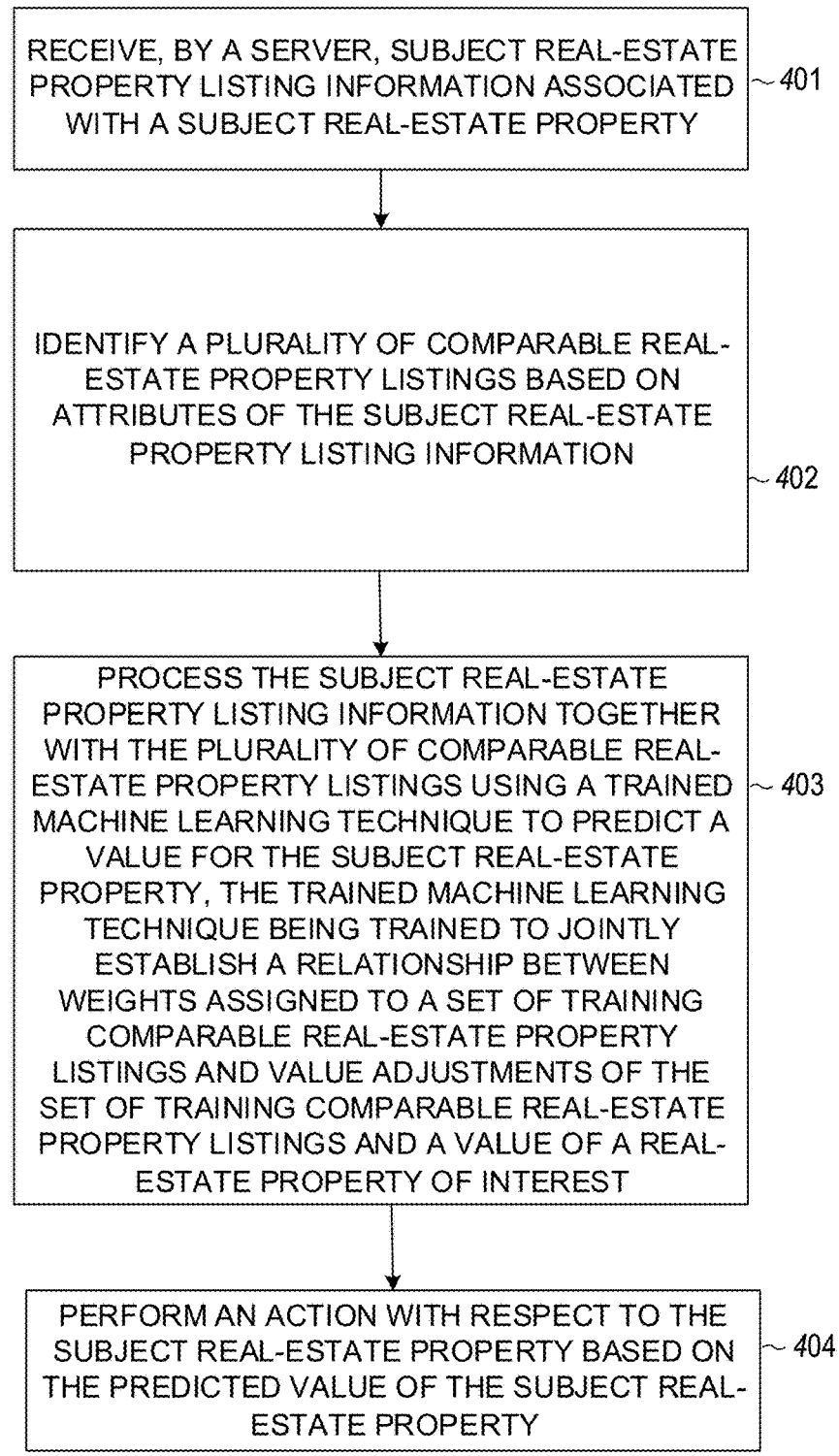
FIG. 4 illustrates a flow diagram of a process for automatically predicting a value for a real-estate property, according to some example embodiments.

FIG. 4 illustrates a flow diagram of a process 400 for automatically predicting a value for a real-estate property, according to some example embodiments. The process 400 may be embodied in computer-readable instructions for execution by one or more processors such that the operations of the process 400 may be performed in part or in whole by the functional components of the server system 108; accordingly, the process 400 is described below by way of example with reference thereto. However, in other embodiments at least some of the operations of the process 400 may be deployed on various other hardware configurations. The process 400 is therefore not intended to be limited to the server system 108 and can be implemented in whole, or in part, by any other component.

At operation 401, a computing system (e.g., server system 108) receives, by a server, subject real-estate property listing information associated with a subject real-estate property. For example, the new real-estate property data module 240 may receive input that identifies a given subject property by an address or other characteristics or attributes.

At operation 402, the computing system identifies a plurality of comparable real-estate property listings based on attributes of the subject real-estate property listing information. For example, the value determination system 124 applies a trained machine learning technique to the address or other characteristics or attributes of the given subject property to identify comps (e.g., 10 different properties within a certain distance and having the same or similar attributes as the subject property).

At operation 403, the computing system processes the subject real-estate property listing information together with the plurality of comparable real-estate property listings using a trained machine learning technique to predict a value for the subject real-estate property. As described above, the trained machine learning technique is trained to jointly establish a relationship between weights assigned to a set of training comparable real-estate property listings and value adjustments of the set of training comparable real-estate property listings and a value of a real-estate property of interest. For example, the trained machine learning technique module 230 processes the identified comps and the given subject property to estimate a value for the given subject property. The trained machine learning technique module 230 jointly estimates the weights of each of the identified comps and the value adjustments of each of the identified comps to derive or estimate the value for the subject real-estate property. For example, the trained machine learning technique module 230 adjusts the values of each comp by the associated or respective estimated adjustment value and then applies the weights to the corresponding values adjusted by the value adjustments. The weighted adjusted values are combined, such as linearly, to compute or estimate the value for the subject real-estate property.

At operation 404, the computing system performs an action with respect to the subject real-estate property based on the predicted value of the subject real-estate property. For example, the estimated value is provided to a computing device to be presented to a user. In some cases, a distribution of values is presented to an operator or user along with the corresponding weights of the comps for each value along the distribution of values.

Figure 6:
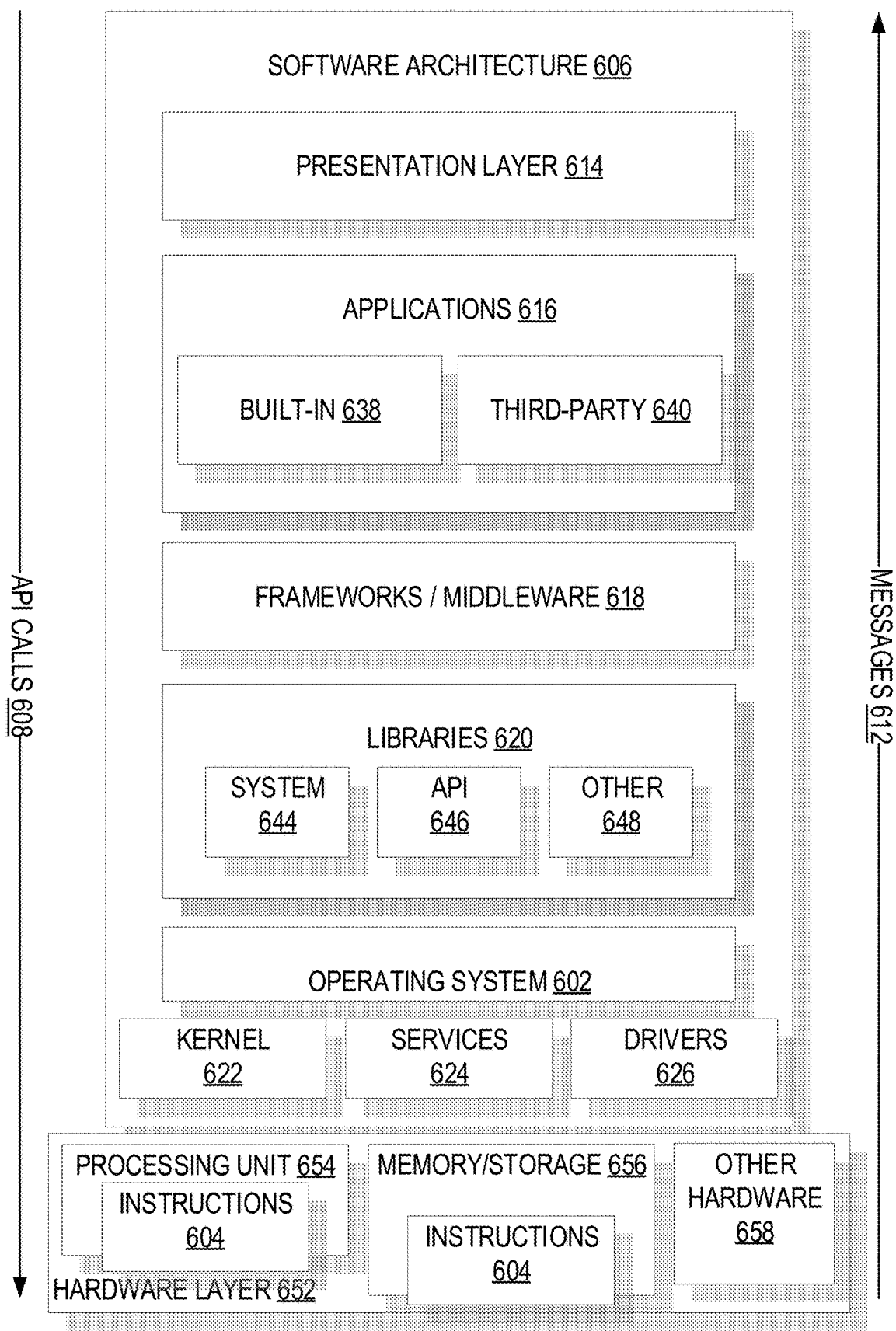
FIG. 6 is a block diagram illustrating an example of a software architecture that may be installed on a machine, according to some example embodiments.

FIG. 6 is a block diagram illustrating software architecture 606, which can be installed on any one or more of the devices described above. For example, in various embodiments, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various embodiments, the software architecture 606 is implemented by hardware such as machine 700 of FIG. 7 that includes processors 704, memory/storage 706, and I/O components 718. In this example, the software architecture 606 can be conceptualized as a stack of layers where each layer may provide a particular functionality. For example, the software architecture 606 includes layers such as an operating system 602, libraries 620, frameworks 618, and applications 616. Operationally, the applications 616 invoke application programming interface (API) calls 608 through the software stack and receive messages 612 in response to the API calls 608, consistent with some embodiments.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some embodiments. For example, the kernel 622 provides memory management, processor management (e.g., scheduling), component management, networking, and security settings, among other functionality. The services 624 can provide other common services for the other software layers. The drivers 626 are responsible for controlling or interfacing with the underlying hardware, according to some embodiments. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some embodiments. For example, the frameworks 618 provide various graphic user interface (GUI) functions, high-level resource management, high-level location services, and so forth. The frameworks 618 can provide a broad spectrum of other APIs that can be utilized by the applications 616, some of which may be specific to a particular operating system 602 or platform.

In an example embodiment, the applications 616 include a home application, a contacts application, a browser application, a book reader application, a location application, a media application, a messaging application, a game application, and a broad assortment of other applications such as a third-party application 640. According to some embodiments, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 640 can invoke the API calls 608 provided by the operating system 602 to facilitate functionality described herein.

Some embodiments may particularly include a real estate application. In certain embodiments, this may be a stand-alone application that operates to manage communications with a server system such as third-party servers 130 or server system 108. In other embodiments, this functionality may be integrated with another application. The real estate application may request and display various data related to real estate and may provide the capability for a user to input data related to the objects via a touch interface, keyboard, or using a camera device of machine 700, communication with a server system via I/O components 718, and receipt and storage of object data in memory/storage 706. Presentation of information and user inputs associated with the information may be managed by real estate application using different frameworks 618, library 620 elements, or operating system 602 elements operating on a machine 700.

Figure 7:
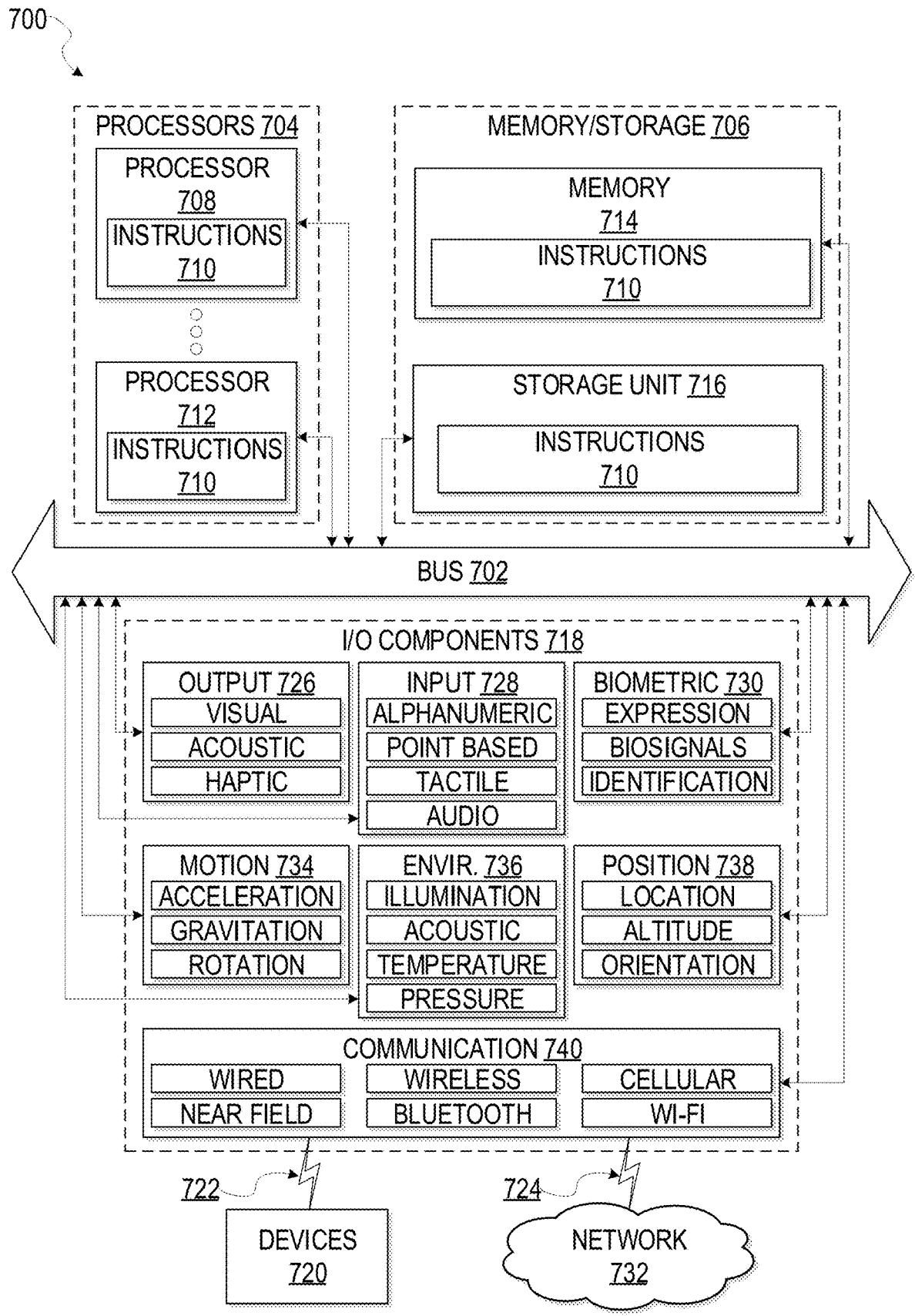
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application 616, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 108, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

In various embodiments, the machine 700 comprises processors 704, memory 714, and I/O components 718, which can be configured to communicate with each other via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 708 and a processor 712 that may execute the instructions 710. The term "processor" is intended to include multi-core processors 704 that may comprise two or more independent processors 704 (also referred to as "cores") that can execute instructions 710 contemporaneously. Although FIG. 7 shows multiple processors 704, the machine 700 may include a single processor 704 with a single core, a single processor 704 with multiple cores (e.g., a multi-core processor 704), multiple processors 704 with a single core, multiple processors 704 with multiples cores, or any combination thereof.

The memory/storage 706 comprises a main memory 714, a static memory, and a storage unit 716 accessible to the processors 704 via the bus 702, according to some embodiments. The storage unit 716 can include a machine-readable medium on which are stored the instructions 710 embodying any one or more of the methodologies or functions described herein. The instructions 710 can also reside, completely or at least partially, within the main memory 714, within the static memory, within at least one of the processors 704 (e.g., within the processor's cache memory), or any suitable combination thereof, during execution thereof by the machine 700. Accordingly, in various embodiments, the main memory 714, the static memory, and the processors 704 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions 710, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 718 include a wide variety of components to receive input, provide output, produce output, transmit information, exchange information, capture measurements, and so on. In general, it will be appreciated that the I/O components 718 can include many other components that are not shown in FIG. 7. The I/O components 718 are grouped according to functionality merely for simplifying the following discussion, and the grouping is in no way limiting. In various example embodiments, the I/O components 718 include output components 726 and input components 728. The output components 726 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 728 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 718 include biometric components 730, motion components 734, environmental components 736, or position components 738, among a wide array of other components. For example, the biometric components 730 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 738 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 718 may include communication components 740 operable to couple the machine 700 to a network 732 or devices 720 via a coupling 724 and a coupling 722, respectively. For example, the communication components 740 include a network interface component or another suitable device to interface with the network 732. In further examples, communication components 740 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 720 may be another machine 700 or any of a wide variety of peripheral devices (e.g., a peripheral device coupled via a Universal Serial Bus (USB)).

Moreover, in some embodiments, the communication components 740 detect identifiers or include components operable to detect identifiers. For example, the communication components 740 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 740, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 732 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 722 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 710 are transmitted or received over the network 732 using a transmission medium via a network interface device (e.g., a network interface component included in the communication components 740) and utilizing any one of a number of well-known transfer protocols (e.g., Hypertext Transfer Protocol (HTTP)). Similarly, in other example embodiments, the instructions 710 are transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a server, subject real-estate property listing information associated with a subject real-estate property;
   identifying a plurality of comparable real-estate property listings based on attributes of the subject real-estate property listing information;
   processing the subject real-estate property listing information together with the plurality of comparable real-estate property listings using a trained machine learning technique to predict a value for the subject real-estate property, the trained machine learning technique being trained to jointly establish a relationship between weights assigned to a set of training comparable real-estate property listings and value adjustments of the set of training comparable real-estate property listings and a value of a real-estate property of interest, the trained machine learning technique being trained by performing training operations including:
  selecting, as the real-estate property of interest, a first comparable real-estate property listing from a set of comparable real-estate property listings;
  computing a first quantity comprising an estimate of a relative price difference between the real-estate property of interest and a given comparable real-estate property listing;
  computing a second quantity comprising a weight characterizing a relative strength of the given comparable real-estate property listing;
  adjusting values of a collection of the training comparable real-estate property listings based on the first quantity and the second quantity;
  computing a regression loss based on a point estimate of the value of the real-estate property of interest and a ground truth value for the real-estate property of interest; and
  updating parameters of the machine learning technique based on the computed regression loss; and
performing an action with respect to the subject real-estate property based on the predicted value of the subject real-estate property.

2. The method of claim 1, wherein the trained machine learning technique is further trained to jointly optimize mean and uncertainty predictions for the set of training comparable real-estate properties.

3. The method of claim 1, wherein the trained machine learning technique comprises a Siamese Network.

4. The method of claim 1, wherein the weights assigned to the set of training comparable real-estate properties represent how much a value of a respective one of the set of training comparable real-estate properties influences the value of the real-estate property of interest, and wherein the value adjustments represent how much more or less expensive the respective one of the set of training comparable real-estate properties is relative to the real-estate property of interest.

5. The method of claim 1, wherein the trained machine learning technique is configured to output the first quantity and the second quantity.

6. The method of claim 5, further comprising:
  adjusting values of the plurality of comparable real-estate property listings based on the first quantity associated with each of the plurality of comparable real-estate property listings; and
  modifying the adjusted values of the plurality of comparable real-estate property listings respectively by the second quantity of each of the plurality of comparable real-estate property listings to compute a point estimate of the value of the subject real-estate property.

7. The method of claim 1, wherein the training operations are performed before receiving the subject real-estate property listing information associated with a subject real-estate property, the method comprises:
  accessing the set of training comparable real-estate property listings;
  selecting, as the real-estate property of interest, a first comparable real-estate property listing from the set of comparable real-estate property listings; and
  identifying the collection of the training comparable real-estate property listings that have attributes that match attributes of the real-estate property of interest.

8. The method of claim 7, further comprising repeating the training operations for each of the comparable real-estate properties in the set of comparable real-estate properties, wherein the set of training comparable real-estate property listings is stored as a three-dimensional tensor in which, a first dimension of the three-dimensional tensor represents a plurality of subject properties, a second dimension of the three-dimensional tensor represents a plurality of comparable properties associated with each of the plurality of subject properties, and a third dimension of the three-dimensional tensor represents a plurality of features of the plurality of subject properties and the plurality of comparable properties.

9. The method of claim 7, further comprising repeating the training operations periodically and in response to receiving new training comparable real-estate property listings.

10. The method of claim 1, wherein the machine learning technique is trained to compute the weights assigned to the set of training comparable real-estate properties and the value adjustments of the set of training comparable real-estate property listings jointly based on a same set of parameters.

11. The method of claim 1, further comprising:
  predicting, by the trained machine learning technique, a distribution of values for the subject real-estate property, the distribution of values comprising the predicted value.

12. The method of claim 11, wherein the predicted value comprises a median value for the subject real-estate property, and wherein the distribution of values further comprises at least one of a $10^{th}$ percentile value, a $25^{th}$ percentile value, a $75^{th}$ percentile value or a $99^{th}$ percentile value.

13. The method of claim 1, further comprising:
  receiving input requesting that the predicted value for the subject real-estate property be for a specified quantile above a median; and
  generating a display comprising data representing at least one of weights or value adjustments associated with the plurality of comparable real-estate property listings based on the predicted value for the subject real-estate property being the specified quantile above the median.

14. The method of claim 1, further comprising generating, by the trained machine learning technique, a display comprising data representing a distribution of values for the subject real-estate property and changes to weights associated with the plurality of comparable real-estate property listings relative to the distribution of values, the display comprising information on how the weights change as different values along the distribution of values are selected.

15. A system comprising:
  a memory that stores instructions; and
  one or more processors on a server configured by the instructions to perform operations comprising:
    receiving, by a server, subject real-estate property listing information associated with a subject real-estate property;
    identifying a plurality of comparable real-estate property listings based on attributes of the subject real-estate property listing information;
    processing the subject real-estate property listing information together with the plurality of comparable real-estate property listings using a trained machine learning technique to predict a value for the subject real-estate property, the trained machine learning technique being trained to jointly establish a relationship between weights assigned to a set of training comparable real-estate property listings and value adjustments of the set of training comparable real-estate property listings and a value of a real-estate property of interest, the trained machine learning technique being trained by performing training operations including:

selecting, as the real-estate property of interest, a first comparable real-estate property listing from a set of comparable real-estate property listings;

computing a first quantity comprising an estimate of a relative price difference between the real-estate property of interest and a given comparable real-estate property listing;

computing a second quantity comprising a weight characterizing a relative strength of the given comparable real-estate property listing;

adjusting values of a collection of the training comparable real-estate property listings based on the first quantity and the second quantity;

computing a regression loss based on a point estimate of the value of the real-estate property of interest and a ground truth value for the real-estate property of interest; and updating parameters of the machine learning technique based on the computed regression loss; and performing an action with respect to the subject real-estate property based on the predicted value of the subject real-estate property.

16. The system of claim 15, wherein the trained machine learning technique is further trained to jointly optimize mean and uncertainty predictions for the set of training comparable real-estate properties.

17. The system of claim 15, wherein the trained machine learning technique comprises a Siamese Network.

18. The system of claim 15, wherein the weights assigned to the set of training comparable real-estate properties represent how much a value of a respective one of the set of training comparable real-estate properties influences the value of the real-estate property of interest, and wherein the value adjustments represent how much more or less expensive the respective one of the set of training comparable real-estate properties is relative to the real-estate property of interest.

19. The system of claim 15, wherein the trained machine learning technique is configured to output the first quantity and the second quantity.

20. A non-transitory computer-readable medium comprising instructions stored thereon that are executable by at least one processor to cause a computing device to perform operations comprising:

receiving, by a server, subject real-estate property listing information associated with a subject real-estate property;

identifying a plurality of comparable real-estate property listings based on attributes of the subject real-estate property listing information;

processing the subject real-estate property listing information together with the plurality of comparable real-estate property listings using a trained machine learning technique to predict a value for the subject real-estate property, the trained machine learning technique being trained to jointly establish a relationship between weights assigned to a set of training comparable real-estate property listings and value adjustments of the set of training comparable real-estate property listings and a value of a real-estate property of interest, the trained machine learning technique being trained by performing training operations including:

selecting, as the real-estate property of interest, a first comparable real-estate property listing from a set of comparable real-estate property listings;

computing a first quantity comprising an estimate of a relative price difference between the real-estate property of interest and a given comparable real-estate property listing;

computing a second quantity comprising a weight characterizing a relative strength of the given comparable real-estate property listing;

adjusting values of a collection of the training comparable real-estate property listings based on the first quantity and the second quantity;

computing a regression loss based on a point estimate of the value of the real-estate property of interest and a ground truth value for the real-estate property of interest; and updating parameters of the machine learning technique based on the computed regression loss; and performing an action with respect to the subject real-estate property based on the predicted value of the subject real-estate property.

* * * * *